C. B. KING.
SPRING SUSPENSION FOR VEHICLES.
APPLICATION FILED JULY 6, 1914.
1,209,716.
Patented Dec. 26, 1916.
2 SHEETS—SHEET 1.
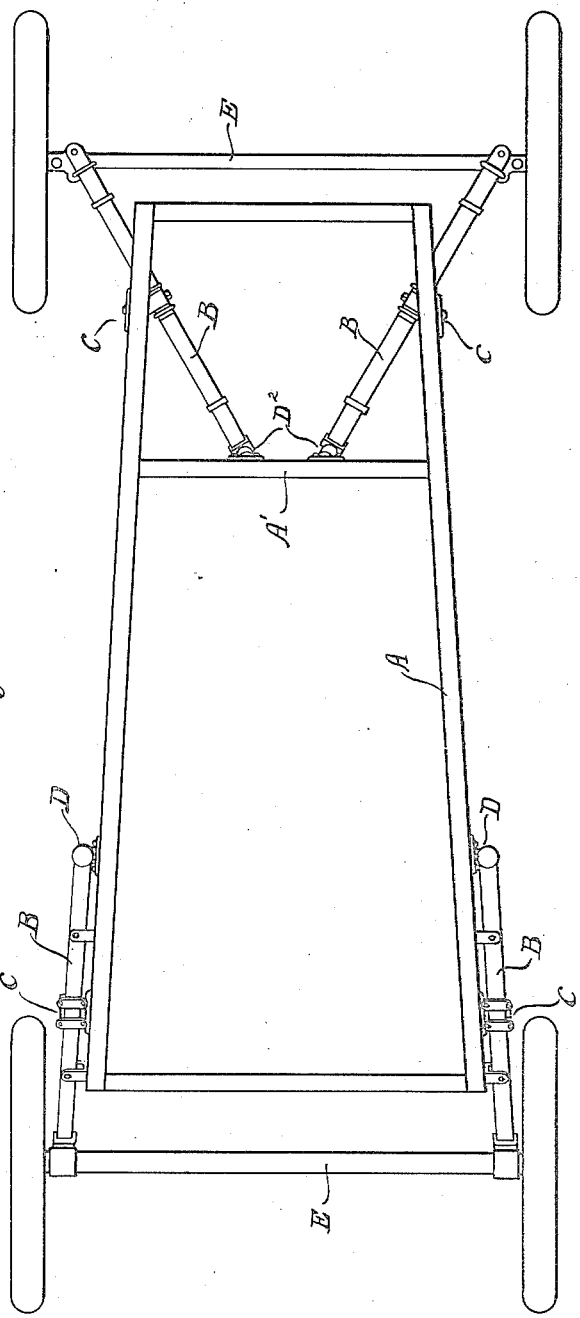
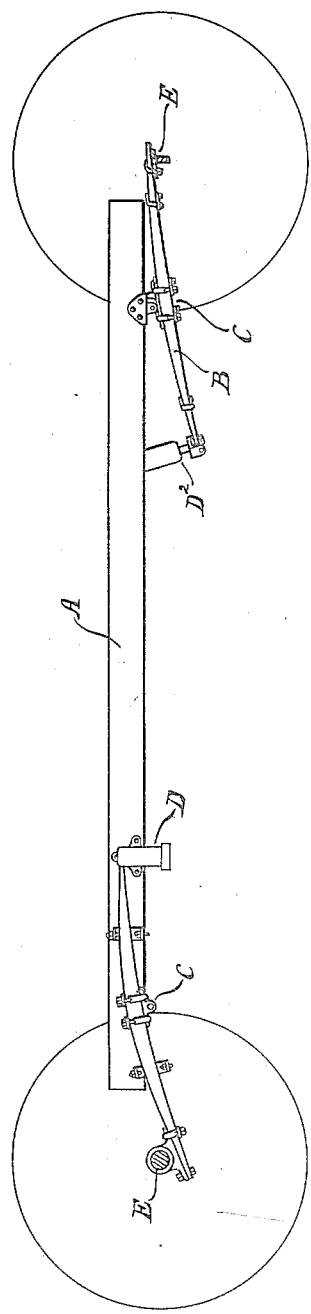
WITNESSES:
James P. Barry
W. K. Ford
INVENTOR
Charles B. King
BY
Whittemore Hulbert & Whittemore
ATTORNEYS

UNITED STATES PATENT OFFICE.

CHARLES B. KING, OF DETROIT, MICHIGAN.

SPRING SUSPENSION FOR VEHICLES.

1,209,716. Specification of Letters Patent. Patented Dec. 26, 1916.

Application filed July 6, 1914. Serial No. 849,136.

*To all whom it may concern:*

Be it known that I, CHARLES B. KING, a citizen of the United States of America, residing at Detroit, in the county of Wayne and State of Michigan, have invented certain new and useful Improvements in Spring Suspensions for Vehicles, of which the following is a specification, reference being had therein to the accompanying drawings.

The invention relates to spring suspensions for vehicles, and it is the object of the invention to obtain a construction which is both sensitive to slight vibrations and road shocks, and is also capable of taking care of heavy shocks.

It is a further object to provide means for automatically dampening the recoil; further, to provide a strongly braced rigid connection between the frame and the axle; and further, various features of construction as hereinafter set forth.

Figure 3:
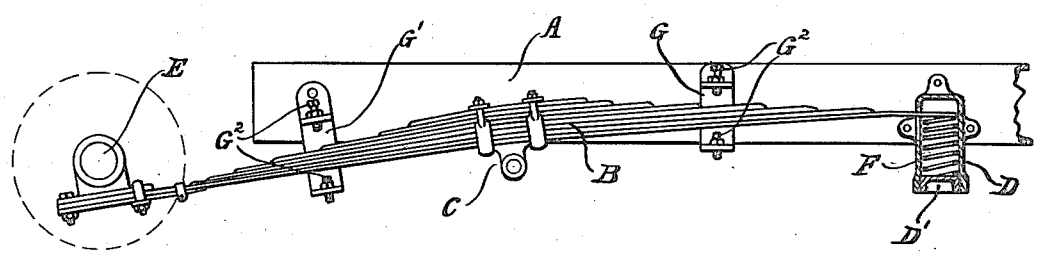
Figure 4:
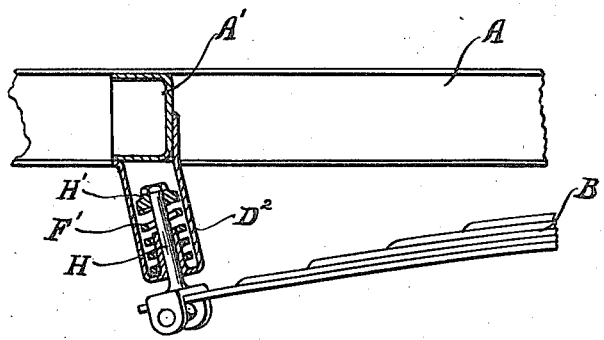

In the drawing: Figure 1 is a plan view of the vehicle frame constructed in accordance with my invention; Fig. 2 is a side elevation; Fig. 3 is an enlarged view of one of the springs; and Fig. 4 is a view showing a detail of construction.

My improved construction employs a type of spring which may be designated as the cantaliver type, and which when deflected will rock about a fulcrum. This rocking movement is provided for partly by the flexure of the cantaliver spring itself and partly through an auxiliary spring, which may be of a lighter tension to take care of the lesser vibrations and shocks. The cantaliver springs are also preferably arranged at such angles as to, first, form a braced rigid connection between the vehicle frame and axles; and second, to favorably receive the road shocks.

In detail, A is the vehicle frame, of any suitable construction, adapted for the support of the drive mechanism and the vehicle body.

B are the cantaliver springs which are connected to the frame by intermediate fulcrum bearings C, and also at one end by an anchoring bearing D. The opposite end of the cantaliver is attached to the axle E and thus forms a resilient rigid connection between said axle and the frame. As above stated, the cantaliver spring is preferably employed in connection with an auxiliary spring of lesser tension. This, as shown, is in the form of a coil spring F, which is housed in the anchor bearing D, which latter is slotted for the passage of the end of the spring B thereinto. The spring F may be inserted through an aperture in the end of the bearing D and secured in position by a plug cap D'. Thus in action the slight shocks will produce a rocking movement of the cantaliver spring B and a flexing of the auxiliary springs F only, while the greater shocks will cause a flexing of the cantaliver. For further graduating the resistance of the spring and also for dampening the recoil I preferably place intermediate the ends of the cantaliver one or more auxiliary fulcrums. As shown in Fig. 3, a dampening device G is placed between the fulcrum C and the end of the spring engaging the auxiliary spring F, and a second dampening device G' is arranged between the fulcrum C and the end of the spring engaging the axle. These are designed to be brought successively into action, so that after a certain rocking of the lever B the spring will bear against the fulcrum in the dampening device G, thereby, in effect, shortening its length, and after a further rocking movement will bear against the fulcrum of the dampening device G', which still further shortens its active portion. The dampening devices G and G' may be formed by brackets attached to the frame A and bifurcated to embrace the spring to form fulcrum bearings above and below the same. These bearings may, if desired, be adjustable, as by the adjusting screws $G^2$, so that the clearance space may be altered to produce the desired action.

When the vehicle is traveling in a forward direction the shocks produced by obstacles in the road bed generally react at an oblique angle instead of being perpendicular. These shocks are therefore most favorably received where the cantaliver spring is also obliquely arranged in climbing upward in a forward direction. Such an arrangement I have secured with the forward spring by placing the anchor bearing $D^2$ as depending from the cross bar A' of the frame, the connection between the cantaliver spring and this bearing being formed by a shank H which slidably engages the bearing and has a collar H' thereon for engaging the auxiliary spring F'. The upward inclination of the front spring as regards its relation to the axle tends to make the spring more properly functioned and have less tendency to buckle on the forward thrust end of the spring when severe shocks or heavy obstacles are met. In other words the road shocks react more nearly at right angles to the spring and thus end shocks are eliminated.

It is usual to attach the frame supporting springs to the axle at points some distance from the ends thereof, and where longitudinally-extending springs are employed these are usually parallel to each other upon opposite sides of the frame. I have secured a much stronger, lighter and better braced construction by a non-parallel arrangement of the springs B on opposite sides of the frame, and one in which said springs extend at an outwardly-flaring angle from the frame to the axle. This has several advantages: first, in that it brings the point of attachment between the spring and axle near the supporting wheel and therefore lessens the stress upon the axle and permits of diminishing the size and weight thereof; second, it provides clearance for the steering wheels; and third, it forms a strongly braced reach between each axle and the frame for resisting lateral stress. As shown in detail, the forward springs B' extend from a point upon the cross bar A' intermediate the side sills to the fulcrum bearing C secured to the side sill and then outward to a bearing I upon the axle near the outer end thereof. In the same manner the rear spring B extends at an opposite angle to the frame, but as clearance is not required for the turning of the wheels the rear springs may be arranged outside the side sills of the frame. Thus, both the forward and rear axles are rigidly braced by the flaring angular arrangement of the springs, so that the rectangularity of the structure and parallelism of the axles is maintained without interfering with flexibility for receiving shocks.

What I claim as my invention is:—

1. A vehicle spring, comprising a cantaliver spring arm, means intermediate the ends of the spring arm for limiting the rocking movement of said cantaliver, and an auxiliary spring of lighter tension for resisting the rocking of said spring arm within the limits of its movement.

2. A vehicle spring, comprising a cantaliver spring arm tensioned for heavy shocks, a fulcrum upon which said arm is pivotally supported, means intermediate the ends of the spring arm and upon both sides of said fulcrum for limiting the rocking movement of said arm, and an auxiliary spring of lesser tension for resisting rocking movement of said arm within its limits.

3. A vehicle spring, comprising a cantaliver spring arm, a fulcrum upon which said arm is freely rockable, an auxiliary spring of lesser tension for resisting rocking movement of said arm, and a stop for limiting the free movement of said arm on its fulcrum.

4. A vehicle spring, comprising a cantaliver spring arm, a fulcrum upon which said arm is rockable, means for limiting the rocking movement of one end of said arm, and means intermediate the ends of said arm for further limiting the rocking movement thereof, said means permitting flexing movement thereof.

5. A vehicle spring, comprising a cantaliver spring arm, a fulcrum upon which said arm is rockable, and a series of stops for successively contacting with said arm at different points in the length thereof, to successively limit the rocking movement of said arm.

6. A vehicle spring, comprising a cantaliver spring arm, a fulcrum upon which said arm is rockable, and stops embracing said arm and limiting the rocking movement thereof in opposite directions.

7. A vehicle spring, comprising a cantaliver spring arm, a fulcrum upon which said arm is rockable, and a series of stops embracing said arm and progressively contacting therewith to limit the rocking movement thereof in opposite directions.

8. A vehicle spring, comprising a cantaliver spring arm, a fulcrum upon which said arm is rockable, a spring of lesser tension for resisting movement of one end of said arm, and intermediate stops for contacting with said arm progressively to limit the rocking movement thereof and increase the tension.

9. In a vehicle, the combination with a frame and forward and rear axles, of cantaliver springs extending between said frame and the respective axles, each inclining upward in a forward direction, fulcrums for rockably connecting said cantaliver springs to said frame, and auxiliary springs at the inner ends of said cantaliver springs for connecting the same to the frame.

10. In a vehicle, the combination with a frame and an axle of cantaliver spring arms attached to said axle at their outer ends and extending obliquely inward at opposite angles to said frame, adjustable stops for limiting the rocking movement of said cantaliver springs upon said frame, and anchoring connections between the opposite ends of said cantaliver springs and frame.

11. In a vehicle, the combination with a frame and a spring arm, of a dampening device in the form of a bracket attached to said frame and bifurcated to embrace said spring arm to form fulcrum bearings above and below the same.

12. In a vehicle, the combination with a frame and a spring arm, of a dampening device in the form of a bracket attached to said frame and bifurcated to embrace said spring arm, and adjustable screws in the furcations for engaging said spring arm.

13. In a vehicle, the combination with the frame and forward axle, of cantaliver springs connected at their outer ends to said axle adjacent to the ends thereof and extending at opposite angles inward to points of attachment to the frame nearer the center thereof, and a fulcrum for rockably connecting each cantaliver spring to said frame intermediate the points of attachment of each spring to the frame and forward axle.

14. In a vehicle, the combination with a frame and forward axle, of cantaliver springs extending obliquely outward from said frame and at opposite angles thereto and attached to said forward axle, said axle being at the forward ends of said springs, and means for connecting each cantaliver spring to said frame intermediate the points of attachment of each spring to the frame and forward axle.

15. A vehicle spring comprising a cantaliver spring arm, a fulcrum upon which said arm is rockable, and means for successively contacting with said arm at different points in the length thereof to successively limit the rocking movement of said arm.

16. A vehicle spring, comprising a cantaliver spring arm, and an adjustable stop adapted to engage said arm and to limit the rocking movement thereof in different positions of adjustment.

In testimony whereof I affix my signature in presence of two witnesses.

CHARLES B. KING.

Witnesses:
JAMES P. BARRY,
W. K. FORD.